Figure 1:
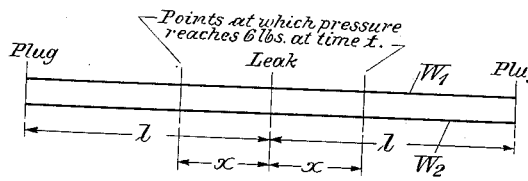

Dec. 8, 1936.  H. NYQUIST  2,063,187
METHOD OF CABLE MAINTENANCE
Filed Oct. 17, 1935

INVENTOR
*H. Nyquist*
BY
ATTORNEY

Patented Dec. 8, 1936

2,063,187

UNITED STATES PATENT OFFICE 2,063,187

METHOD OF CABLE MAINTENANCE

Harry Nyquist, Millburn, N. J., assignor to American Telephone and Telegraph Company, a corporation of New York Application October 17, 1935, Serial No. 45,511

6 Claims. (Cl. 175—183)

This invention relates to methods of maintaining cables and the like, and more particularly to methods of determining the location and the relative magnitude of a break in the sheath of a cable or the like which is maintained under pressure of gas or other fluid.

As understood by those skilled in the art, the pressure methods of cable maintenance involve the division of the cable into sections by plugs which block the passage of the gas or other fluid beyond certain points. A cable section is normally filled with gas or other fluid to a pressure, for example, of 9 pounds above the normal atmospheric pressure when the pressure within the cable is at a temperature of 60° F. When a break occurs in the cable sheath, the result is, of course, the escape of gas from the cable section in which the break is located. It is the practice to equip the cable with contactors regularly spaced along the cable and designed to complete, upon operation, an electrical circuit which includes a pilot or other pair of conductors in the cable and suitable equipment at offices located at the cable terminals. The contactors are, of course, located within the cable sheath or within a chamber communicating with the cable sheath and are designed to operate and complete the indicating circuit when the cable pressure at a particular point served by a contactor falls to a predetermined value—for example, 6 pounds above the normal atmospheric pressure at the given cable temperature.

It will be understood that, in general, the pressure methods of cable maintenance should lead to the location and repair of the sheath break before detrimental action to the electrical circuits results from entrance of moisture. It is important, therefore, that the fault be located as quickly as possible, and it will be understood further that it is of interest to determine the relative magnitude of the sheath break.

The present invention does not contemplate the presence of a tester in the vicinity of the fault but requires only the presence of a tester (or an automatic testing mechanism) at the terminal offices of the cable system.

In accordance with the novel method of the invention, there are determined at the terminal offices the times of operation of two or more contactors and the locations of the operated contactors, and the location and the relative magnitude of the break are ascertained from the time-distance relations thus discovered. By this method, observations are taken only at the terminal offices and it is possible to determine very quickly the location and magnitude required. It will be understood, of course, that the several contactors operate as the pressure reduction resulting from the sheath break is propagated along the cable section.

The invention will be more clearly understood when the following description is read with reference to the accompanying drawing, of which—

Figure 3:
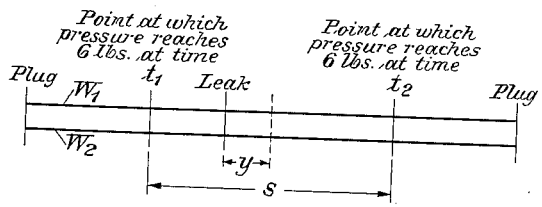
Figure 2:
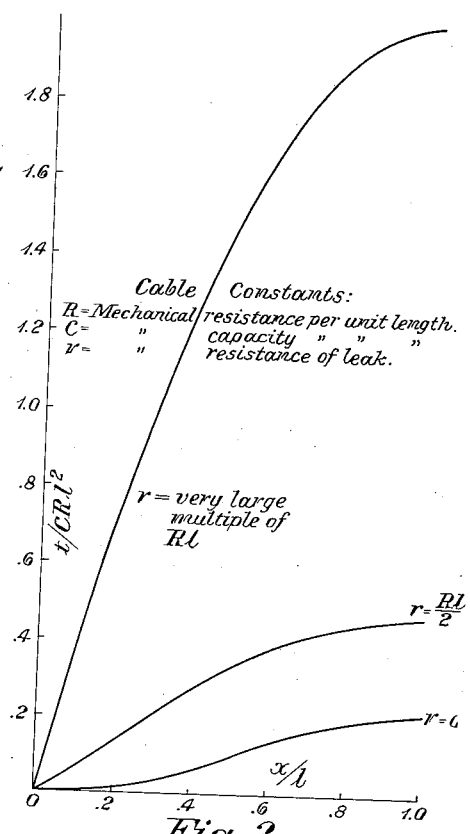
Figure 4:
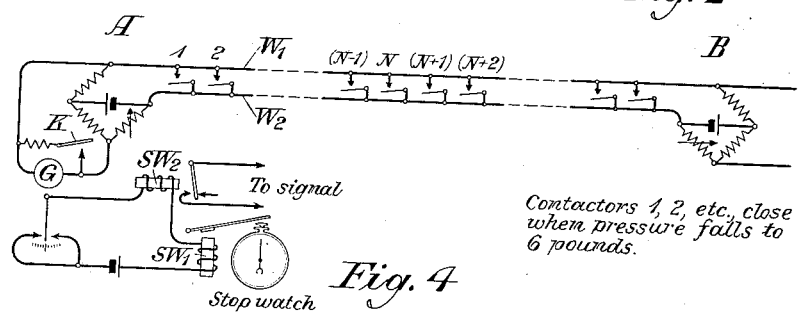
Figure 5:
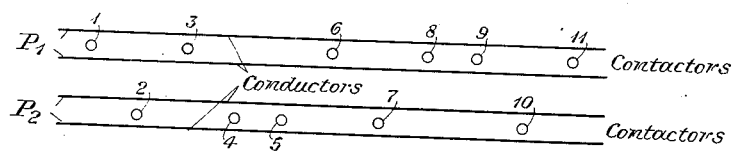

Figure 1 indicates diagrammatically the points and distances involved in the case of a sheath leak located midway between plugs;

Fig. 2 is a diagram showing curves of time versus distance for various sized leaks located midway between plugs;

Fig. 3 indicates the points and distances involved in the case of a leak which is not equidistant from the plugs;

Fig. 4 indicates diagrammatically the apparatus employed in one desirable form of the practice of the invention, and Fig. 5 indicates schematically an arrangement which permits the practice of the invention with a closer approach to accuracy than is the case with the arrangement of Fig. 4.

With reference first to Fig. 1 of the drawing, let it be assumed that the leak in the sheath of the cable, which includes the pilot or other conductors $W_1$ and $W_2$, is midway between the plugs terminating the section. Two points are indicated at which the pressure reaches 6 pounds, for example, at time $t$. It will be understood that these points may correspond to the locations of the contactors. Let the distance between the leak and either contactor point be represented by $x$ and the distance between the leak and either plug by $l$. It will be understood that the spacing of the contactors should be in accordance with the fact that the period elapsing between the occurrence of the break and the operation of the contactors is directly proportional to the square of the separation between the contactors, in the case of a major break occurring midway between two contactors. It is to be borne in mind that in the case contemplated in connection with the present invention, the only quantities that can be observed following the occurrence of a sheath break are the times of operation of the successive contactors and the effect of the operation on the resistances of the circuit affected by the contactors. The observed resistance is converted into distance and the quantities used in determining the location and magnitude of the break are distance and time.

With Fig. 1 and the immediately preceding discussion in mind, the reader's attention is now directed to Fig. 2, which shows three computed curves of time versus distance for leaks of three different sizes located midway between plugs. It will be noted that in addition to the quantity representations of Fig. 1, R represents the mechanical resistance per unit length, C represents the mechanical capacity per unit length and $r$ represents the resistance of the leak. The curve marked "$r=0$" represents the case in which the leak offers negligible resistance to the escaping gas. The curve marked $$"r = \frac{Rl}{2}"$$

represents the case in which the resistance of the leak equals one-fourth of the total resistance of the cable between plugs. The curve marked "$r=$ very large multiple of $Rl$" represents the case of a very small leak. It is apparent from an examination of Fig. 2 that if time is plotted against distance, the slope of the curve increases as $r$ increases and, accordingly, $r$ (indicating the magnitude of the break) may be determined from the slope of the curve.

The observed curve of time versus distance will consist of two branches, one for distances east and one for distances west from the leak. If $r=0$, these two branches form a smooth curve of which the lowest point corresponds to the leak both in location and in time of occurrence. If $r>0$, the two branches do not form a single smooth curve but intersect at a point which corresponds in distance to the location of the leak and in time to the instant when the pressure at the leak passed through 6 pounds. Thus, the two branches of the curve indicate by their slope the size of the leak and, by their intersection or lowest point, the location of the leak. It will be understood that the invention is practiced by observation at the two terminal offices and by the necessary computation based on the data resulting from such observation.

Fig. 3 of the drawing indicates the points and distances involved in the case in which the leak is not midway between the plugs. In this case, the two branches of the time versus distance curve are not, in general, symmetrical but there is no departure from the conclusion that the slopes are determined by $r$ and the intersection of the two curve branches by the location of the leak.

If $r=0$, the curve is a parabola for distances up to approximately .4 of the distance to the nearer plug, obeying the equation $t=kx^2$, where computations give the value of $k$ as .378 CR. The location of the leak can then be determined from the time interval T between the times of operation of two contactors. Let $s$ represent the distance between the leak and a point midway between the contactors. Then $$y+\frac{s}{2}$$

is the distance from the leak to the farther of the two contactors, and $$y-\frac{s}{2} \left( \text{or } \frac{s}{2}-y \right)$$

is the distance from the leak to the nearer contactor. In accordance with the parabolic law, the farther contactor operates at the time $$t_2 = k(y+s/2)^2$$

and the nearer contactor operates at the time $$t_1 = k(y-s/2)^2.$$

The time interval between the two operations (T) is then determined from the following equation:

$$t_2 - t_1 = k((y+s/2)^2 - (s/2-y)^2) = 2ksy = T$$

and $$y = T/2ks.$$

Thus, when T is known, the break is readily located.

It will be understood that the distance to the latest contactor to operate is determined by resistance measurements. Since it is assumed that office records are available, it is not necessary to make this determination with great accuracy but it is necessary that the resistance measurement effect a location which is nearer the correct contactor than any other. In practice, of course, the error in location should be considerably less than one-half the distance between adjacent contactors.

With reference to Fig. 4 of the drawing, a pilot pair consisting of conductors $W_1$ and $W_2$ is equipped with regularly spaced contactors and with terminal equipment at offices A and B. At each office, the terminal equipment consists of a Wheatstone bridge comprising two adjacent arms of fixed and equal resistance, the pilot pair and an arm of variable resistance; and suitable means for signaling the attendant and for starting a stop-watch when the bridge becomes unbalanced. The bridge batteries at the two offices, which are preferably not grounded, are connected in opposition, as shown, so that if they are equal there is normally no current in the line. The current of the galvanometer shown may be reduced to a suitably small value by a removable shunt under the control of a key K. The complete terminal apparatus is shown only in the case of office A. The galvanometer controls circuits including relays $SW_1$ and $SW_2$, the former controlling the starting of a stop-watch and the latter controlling a circuit including some suitable visual or audible signal for summoning the attendant. It will be understood that at station B there is apparatus corresponding to that disclosed at station A.

The pilot pair is equipped with contactors 1, 2, N−1, N, N+2, etc., it being understood that each contactor operates when the cable pressure at the point served by the particular contactor falls, for example, to 6 pounds above the normal atmospheric pressure when the pressure within the cable is at a temperature of 60° F. Let it be assumed that there is a sheath break and the resultant escape of gas near the contactor N. As the pressure reduction is propagated, the pressure at N will fall to 6 pounds and the contactor will operate. This operation causes an unbalance of the bridges at offices A and B and the galvanometers operate to close the circuits through relays $SW_1$ and $SW_2$. Consequently, the stop-watch starts and the attendant is summoned at each office. The attendants then rebalance the bridges and reset or replace the stop-watches. As the pressure reduction is propagated, contactors N−1, N+1, etc. operate and as these operations take place, the same operations are repeated at the offices except that contactors N−1, etc. affect the apparatus at office A only while contactors N+1, N+2, etc. affect the apparatus at office B only.

From successive observations at the offices, points are plotted on a time versus distance diagram to produce both branches of curves such as that disclosed in Fig. 2. It will be understood that from these curves the leak may be located with an approach to accuracy, the location being indicated by the intersection or low point of the two branches of the curve.

It will be understood that the change in resistance of the variable resistance arm of one of the bridges necessary to produce a rebalance gives some indication of the location of the contactor which has just operated. This indication, together with records, which it is assumed are available at the offices, enables the testers at the offices to obtain the necessary distance data. As has been pointed out hereinabove, these data along with the results of the observation of the operation times of the contactors give the necessary material for computing the time versus distance curves from which the location and magnitude are determined.

Certain refinements will tend to produce greater accuracy. For example, two pilot pairs may be used, with every other contactor placed on the same pair. With this arrangement, the permissible error in determining the distance to one of the contactors would be doubled.

A further refinement is indicated in Fig. 5. In this case, two contactor pairs are employed and there is introduced an irregularity of contactor placement such as that schematically disclosed, in which contactors 1, 3, 6, 8, 9, 11, etc. are placed on pair $P_1$ while contactors 2, 4, 5, 7, 10, etc. are placed on pair $P_2$. This particular arrangement would multiply by 8, as against the arrangement of Fig. 4, the permissible error in determining which contactor has operated. Incidentally, the use of two pairs would have the advantage that if one pair should become disabled, it would be possible to work with the other, though at reduced speed and accuracy.

It will be understood that various refinements, not involving invention, may be employed to increase the accuracy of the computation leading to the determination of the location and magnitude of sheath breaks. The description and discussion given hereinbefore, however, serve to point out definitely to those skilled in the art the nature of the invention, the essentials of which are defined in the appended claims.

What is claimed is:

1. The method of ascertaining the location and the relative magnitude of a break in the sheath of a cable or the like maintained under pressure of a fluid, the cable or the like being equipped with pressure-operated contactors and means for indicating at a predetermined location on the line of the cable or the like the operation of any one of the contactors, which consists in observing at the predetermined location the times of operation of a plurality of contactors, ascertaining the locations of the respective operated contactors, and determining the location and the relative magnitude of the sheath break from the time-distance relations thus revealed.

2. The method of locating a break in the sheath of a cable or the like maintained under pressure of a fluid and equipped with pressure-operated contactors, which consists in observing at a predetermined location on the line of the cable or the like the times of operation of a plurality of successively operated contactors, ascertaining at said predetermined location the location of the several operated contactors, and determining the location of the sheath break from the time-distance relations thus revealed.

3. The method of locating a break in the sheath of a cable or the like maintained under pressure of a fluid and equipped with pressure-operated contactors, which consists in observing at a predetermined location on the line of the cable or the like the times of operation of a plurality of successively operated contactors, ascertaining at said predetermined location the location of the several operated contactors, and determining the location of the sheath break from the time intervals and the distances thus revealed.

4. The method of determining the relative magnitude of a break in the sheath of a cable maintained under pressure of a fluid, the cable being equipped with pressure-operated contactors and means for indicating at a predetermined location the operation of any one of the contactors, which consists in observing at the predetermined location the times of operation of a plurality of contactors, ascertaining the locations of the several operated contactors, and plotting the points so determined on a time-distance diagram to form a curve of which the slope will indicate the magnitude to be determined.

5. The method of determining the location and the relative magnitude of a break in the sheath of a cable maintained under pressure of a fluid, the cable being equipped with pressure-operated contactors and means for indicating at one of two offices on the line of the cable the operation of each contactor, which consists in observing at the two offices the times of operation of the contactors, ascertaining the locations of the several operated contactors, plotting the points so determined on a time-distance diagram to form two curves, each based on the location data and the time observations of one office, determining the relative magnitude of the sheath break from the shapes of the curves, and determining the location of the break from the point of intersection of the curves.

6. The method of determining the location of a break in an isolated section of cable which consists in normally maintaining the section under constant fluid pressure, producing an indication at a predetermined location on the line of the cable of a predetermined pressure reduction at any one of a plurality of fixed points within the limits of the section, and observing at the predetermined location the relative time of predetermined pressure reduction at the respective fixed points.

HARRY NYQUIST.